United States Patent Office 3,591,652
Patented July 6, 1971

3,591,652
CONVERSION OF MERCAPTAN TO OLEFIN
AND H₂S
Arthur Lee Larsen, Denver, Colo., assignor to Marathon
Oil Company, Findlay, Ohio
Filed Aug. 26, 1968, Ser. No. 755,434
Int. Cl. C07c 11/02
U.S. Cl. 260—677                                    12 Claims

ABSTRACT OF THE DISCLOSURE

Olefin and H₂S are obtained from alkyl mercaptans by contacting the mercaptans with an iron catalyst at 150°–500° C. for a contact time of at least about 0.5 minute. For example, ethylene and H₂S are obtained in high yields from ethyl mercaptan.

BACKGROUND OF THE INVENTION

U.S. Pat. No. 2,390,099 teaches that ethyl mercaptan can be obtained by reacting ethylene with H₂S at pressures of about 500 atmospheres and at temperatures of about 120°–200° C.

Chemical Abstracts, vol. 56, p. 7580–b, teaches that the catalytical effets of nickel, 18-chromium steel, 18–8 stainless steel, iron, wolfram-molybdenum alloy, wolfram and copper on the manufacture of gaseous olefins from petroleum hydrocarbons are generally negative, especially with the nickel, chromium steel and stainless steel. Also this reference teaches that when liquid feed stocks are used, the amount of gaseous products and the yield of olefin gases are lower than when gaseous feed stocks are used.

SUMMARY OF THE INVENTION

Applicant has discovered that olefins can be obtained from alkyl mercaptans by contacting the mercaptan with an iron catalyst at a temperature within the range of from about 150° to about 500° C. Preferably the contact period is for at least about 0.5 minute. H₂S is obtained as a byproduct.

DESCRIPTION OF THE INVENTION

The alkyl mercaptans useful with this invention include ethyl mercaptan, propyl mercaptan, butyl mercaptan, hexyl mercaptan, decyl mercaptan, etc. Preferably the mercaptan is ethyl mercaptan and propyl mercaptan and more preferably ethyl mercaptan.

The alkyl mercaptan is contacted with an iron catalyst at a temperature within the range of from about 150° to about 500° C. to convert the mercaptan to an olefin and H₂S. The temperature is preferably within the range of from about 200° to about 450° C. and more preferably from about 300° to about 400° C. At this latter temperature range, a very high quality of ethylene is obtained.

The contact time should be for at least about 0.5 minute. Of course, higher contact times are useful but economics will govern the particular contact time. More preferably, the contact time is from about one to about three minutes. It is recognized that larger contact areas of the mercaptan on the iron catalyst may permit shorter contact times.

The catalyst is an iron catalyst and preferably does not contain significant amounts of other elements. Where alloys of iron are used, the conversion of mercaptans to olefins is adversely influenced. Iron catalyst containing minor amounts of metals other than iron are useful but it is preferred that the catalyst be a pure iron catalyst and have a large surface area per unit of weight.

Where the mercaptan is a primary mercaptan, the beta hydrogen combines with the —SH grouping to form H₂S. Thus, alpha olefins are obtained. For example, the following formula indicates the mechanism involved with ethyl mercaptan:

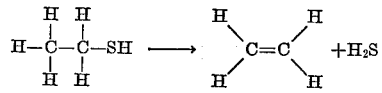

Where the mercaptan contains small amounts of water, some CO₂ is formed as a byproduct. But where the mercaptan is substantially anhydrous, very little CO₂ is formed. Conversions of better than 98% of the ethyl mercaptan to the ethylene can be obtained by the teachings of this invention.

The mercaptan is contacted in a liquid or vapor state with the iron catalyst. Preferably the mercaptan is in a liquid state and can be at ambient temperature, e.g., about 23° C. The products olefin and H₂S are obtained in the gaseous state and such can be separated by conventional means and then liquefied. The olefins are useful in many ways, e.g. as monomers for the production of polymers, etc. The H₂S is useful as a reactant to obtain many useful products.

The following example is illustrated to teach specific embodiments of the invention. The percent conversion indicates the amount of mercaptan converted to an olefin.

Example

Ethyl mercaptan is passed at a rate of about 0.25 ml. per minute through a six-inch long, two-inch standard carbon steel pipe loosely packed with iron wool. The pipe is heated by electric current to a temperature indicated in the table. The ethyl mercaptan comes into the pipe as a liquid and the products leave as gas at the indicated temperatures. The conversions of ethyl mercaptan to ethylene and hydrogen sulfide are indicated in the table.

TABLE

| Run No. | Temperature of iron wool (° C.) | Percent conversion | Comments |
|---|---|---|---|
| 1 | 65 | None noticeable. | |
| 2 | 150 | About 10 | |
| 3 | 200 | 94 to 95 | |
| 4 | 250 | 96 to 97 | |
| 5 | 350 | 98 | High quality ethylene with very little CO₂ formed. |
| 6 | 45 | 99 | Some ethane formed (less than about 1%) but more CO₂ formed than at 350° C. |

NOTE.—These above data show the criticality of the temperature, i.e. at 65° C. no noticeable conversion is obtained and at 450° C. some ethane is formed.

It is intended that this invention not be limited by specific examples taught herein. Rather, all equivalents known to those skilled in the art are to be interpreted with the scope of this invention.

What is claimed is:

1. A process for the catalytical conversion of a feed consisting essentially of alkyl mercaptan to olefin and H₂S, the process comprising contacting the alkyl mercaptan with iron catalyst at a temperature within the range of from about 150° C. to about 500° C. and for a contact time of at least about 0.5 minute.

2. The process of claim 1 wherein the alkyl mercaptan is ethyl mercaptan.

3. The process of claim 1 wherein the alkyl mercaptan is propyl mercaptan.

4. The process of claim 1 wherein the alkyl mercaptan is a primary mercaptan.

5. The process of claim 4 wherein alpha olefins are obtained as a product.

6. The process of claim 1 wherein the alkyl mercaptan is contacted with the iron catalyst at a temperature within the range of from about 200° C. to about 450° C.

7. The process of claim 1 wherein the mercaptan is contacted at a temperature within the range of from about 300° C. to about 400° C.

8. The process of claim 1 wherein the iron catalyst is iron wool.

9. The process of claim 1 wherein the contact time is within the range of from about one to about three minutes.

10. The process of claim 1 wherein the alkyl mercaptan is contacted with the iron catalyst at a temperature within the range of about 200° C. to about 350° C.

11. A process for the catalytical conversion of alkyl mercaptan to olefin and $H_2S$, the process comprising contacting a feed consisting essentially of alkyl mercaptan with an iron catalyst at a temperature within the range of about 200° C. to about 350° C. for a contact time of at least about 0.5 minute.

12. The process of claim 11 wherein the iron catalyst is a substantially pure iron catalyst.

References Cited
UNITED STATES PATENTS

| | | | |
|---|---|---|---|
| 2,143,078 | 1/1939 | Lyman et al. | 196—28 |
| 2,427,309 | 9/1947 | Schulze | 260—609 |

DELBERT E. GANTZ, Primary Examiner

G. J. CRASANAKIS, Assistant Examiner

U.S. Cl. X.R.

260—677

UNITED STATES PATENT OFFICE
CERTIFICATE OF CORRECTION

Patent No. 3,591,652    Dated July 6, 1971

Inventor(s) Arthur Lee Larsen

It is certified that error appears in the above-identified patent and that said Letters Patent are hereby corrected as shown below:

Col. 1, line 25:   Delete "effeits" and insert --effects--.

Col. 1, line 66:   Delete "catalyst" and insert --catalysts--.

Col. 2, line 45:   Delete "45" and insert --450--.

Signed and sealed this 4th day of January 1972.

(SEAL)
Attest:

EDWARD M. FLETCHER, JR.  ROBERT GOTTSCHALK
Attesting Officer        Acting Commissioner of Patents